(12) United States Patent
Schroeder et al.

(10) Patent No.: US 10,520,229 B2
(45) Date of Patent: Dec. 31, 2019

(54) CALORIC HEAT PUMP FOR AN APPLIANCE

(71) Applicant: Haier US Appliance Solutions, Inc., Wilmington, DE (US)

(72) Inventors: Michael Goodman Schroeder, Louisville, KY (US); Michael Alexander Benedict, Palo Alto, CA (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 36 days.

(21) Appl. No.: 15/811,923

(22) Filed: Nov. 14, 2017

(65) Prior Publication Data

US 2019/0145671 A1 May 16, 2019

(51) Int. Cl.
*F25B 21/00* (2006.01)

(52) U.S. Cl.
CPC ........ *F25B 21/00* (2013.01); *F25B 2321/002* (2013.01)

(58) Field of Classification Search
CPC ............ F25B 2321/00; F25B 2321/002; F25B 2321/0021; F25B 2321/0022; F25B 2321/0023; F25B 21/00; H01F 7/021; H01F 7/0226; H01F 1/012
See application file for complete search history.

(56) References Cited

U.S. PATENT DOCUMENTS

| 668,560 | A | 2/1901 | Fulner et al. |
| 1,985,455 | A | 12/1934 | Mosby |
| 2,671,929 | A | 3/1954 | Gayler |
| 2,765,633 | A | 10/1956 | Muffly |
| 3,816,029 | A | 6/1974 | Bowen et al. |
| 3,956,076 | A | 5/1976 | Powell, Jr. et al. |
| 4,037,427 | A | 7/1977 | Kramer |
| 4,102,655 | A | 7/1978 | Jeffery et al. |

(Continued)

FOREIGN PATENT DOCUMENTS

| CA | 2893874 A1 | 6/2014 |
| CA | 2919117 A1 | 1/2015 |

(Continued)

OTHER PUBLICATIONS

C Aprea, et al., An innovative rotary permanent magnet magnetic refrigerator based on AMR cycle, Thermal Energy Systems: Production, Storage, Utilization and the Environment, dated May 2015, Napoli, Italy, pp. 1-5.

(Continued)

*Primary Examiner* — Frantz F Jules
*Assistant Examiner* — Erik Mendoza-Wilkenfel
(74) *Attorney, Agent, or Firm* — Dority & Manning, P.A.

(57) ABSTRACT

A heat pump system includes a caloric heat pump with a regenerator housing that is rotatable about an axial direction. A caloric material is disposed within a chamber of the regenerator housing. The caloric material defines a plurality of channels that extend along the axial direction through the caloric material. The channels of the plurality of channels are spaced from one another along a circumferential direction within the caloric material. A working fluid is flowable through the plurality of channels between end portions of the regenerator housing. A related refrigerator appliance is also provided.

14 Claims, 8 Drawing Sheets

(56) References Cited

U.S. PATENT DOCUMENTS

| | | |
|---|---|---|
| 4,107,935 A | 8/1978 | Steyert, Jr. |
| 4,197,709 A | 4/1980 | Hochstein |
| 4,200,680 A | 4/1980 | Sasazawa et al. |
| 4,259,843 A | 4/1981 | Kausch |
| 4,507,927 A | 4/1985 | Barclay |
| 4,507,928 A | 4/1985 | Johnson |
| 4,549,155 A | 10/1985 | Halbach |
| 4,554,790 A | 11/1985 | Nakagome et al. |
| 4,557,228 A | 12/1985 | Samodovitz |
| 4,599,866 A | 7/1986 | Nakagome et al. |
| 4,625,519 A | 12/1986 | Hakuraku et al. |
| 4,642,994 A | 2/1987 | Barclay et al. |
| 4,735,062 A | 4/1988 | Woolley et al. |
| 4,741,175 A | 5/1988 | Schulze |
| 4,785,636 A | 11/1988 | Hakuraku et al. |
| 4,796,430 A | 1/1989 | Malaker et al. |
| 5,091,361 A | 2/1992 | Hed |
| 5,156,003 A | 10/1992 | Yoshiro et al. |
| 5,249,424 A | 10/1993 | DeGregoria et al. |
| 5,336,421 A | 8/1994 | Kurita et al. |
| 5,351,791 A | 10/1994 | Rosenzweig |
| 5,465,781 A | 11/1995 | DeGregoria |
| 5,599,177 A | 2/1997 | Hetherington |
| 5,661,895 A | 9/1997 | Irgens |
| 5,718,570 A | 2/1998 | Beckett et al. |
| 5,934,078 A | 8/1999 | Lawton, Jr. et al. |
| 6,332,323 B1 | 12/2001 | Reid et al. |
| 6,423,255 B1 | 7/2002 | Hoechsmann et al. |
| 6,446,441 B1 | 9/2002 | Dean |
| 6,467,274 B2 | 10/2002 | Barclay et al. |
| 6,526,759 B2 | 3/2003 | Zimm et al. |
| 6,588,215 B1 | 7/2003 | Ghoshal |
| 6,612,816 B1 | 9/2003 | Vanden Brande et al. |
| 6,668,560 B2 | 12/2003 | Zimm et al. |
| 6,826,915 B2 | 12/2004 | Wada et al. |
| 6,915,647 B2 | 7/2005 | Tsuchikawa et al. |
| 6,935,121 B2 | 8/2005 | Fang et al. |
| 6,946,941 B2 | 9/2005 | Chell |
| 6,971,245 B2 | 12/2005 | Kuroyanagi |
| 7,148,777 B2 | 12/2006 | Chell et al. |
| 7,297,270 B2 | 11/2007 | Bernard et al. |
| 7,313,926 B2 | 1/2008 | Gurin |
| 7,481,064 B2 | 1/2009 | Kitanovski et al. |
| 7,552,592 B2 | 6/2009 | Iwasaki et al. |
| 7,644,588 B2 | 1/2010 | Shin et al. |
| 7,863,789 B2 | 1/2011 | Zepp et al. |
| 7,897,898 B2 | 3/2011 | Muller et al. |
| 7,938,632 B2 | 5/2011 | Smith |
| 8,061,147 B2 | 11/2011 | Dinesen et al. |
| 8,069,662 B1 | 12/2011 | Albert |
| 8,099,964 B2 | 1/2012 | Saito et al. |
| 8,174,245 B2 | 5/2012 | Carver |
| 8,191,375 B2 | 6/2012 | Sari et al. |
| 8,209,988 B2 | 7/2012 | Zhang et al. |
| 8,216,396 B2 | 7/2012 | Dooley et al. |
| 8,310,325 B2 | 11/2012 | Zhang et al. |
| 8,375,727 B2 | 2/2013 | Sohn |
| 8,378,769 B2 | 2/2013 | Heitzler et al. |
| 8,448,453 B2 | 5/2013 | Bahl et al. |
| 8,551,210 B2 | 10/2013 | Reppel et al. |
| 8,596,084 B2 | 12/2013 | Herrera et al. |
| 8,616,009 B2 | 12/2013 | Dinesen et al. |
| 8,656,725 B2 | 2/2014 | Muller et al. |
| 8,695,354 B2 | 4/2014 | Heitzler et al. |
| 8,729,718 B2 | 5/2014 | Kuo et al. |
| 8,763,407 B2 | 7/2014 | Carroll et al. |
| 8,769,966 B2 | 7/2014 | Heitzler et al. |
| 8,869,541 B2 | 10/2014 | Heitzler et al. |
| 8,904,806 B2 | 12/2014 | Cramet et al. |
| 8,935,927 B2 | 1/2015 | Kobayashi et al. |
| 8,978,391 B2 | 3/2015 | Muller et al. |
| 9,175,885 B2 | 11/2015 | Katter |
| 9,245,673 B2 | 1/2016 | Carroll et al. |
| 9,377,221 B2 | 6/2016 | Benedict |
| 9,400,126 B2 | 7/2016 | Takahashi et al. |
| 9,523,519 B2 | 12/2016 | Muller |
| 9,534,817 B2 | 1/2017 | Benedict et al. |
| 9,548,151 B2 | 1/2017 | Muller |
| 9,599,374 B2 | 3/2017 | Takahashi et al. |
| 9,631,843 B2 | 4/2017 | Benedict |
| 9,702,594 B2 | 7/2017 | Vetrovec |
| 9,739,510 B2 | 8/2017 | Hassen |
| 9,797,630 B2 | 10/2017 | Benedict et al. |
| 9,810,454 B2 | 11/2017 | Tasaki et al. |
| 9,857,105 B1 | 1/2018 | Schroeder et al. |
| 9,857,106 B1 | 1/2018 | Schroeder et al. |
| 9,927,155 B2 | 3/2018 | Boeder et al. |
| 9,978,487 B2 | 5/2018 | Katter et al. |
| 10,006,675 B2 | 6/2018 | Benedict et al. |
| 10,018,385 B2 | 7/2018 | Radermacher et al. |
| 2002/0040583 A1 | 4/2002 | Barclay et al. |
| 2002/0066368 A1 | 6/2002 | Zornes |
| 2003/0010054 A1 | 1/2003 | Esch et al. |
| 2003/0051774 A1 | 3/2003 | Saito |
| 2004/0093877 A1 | 5/2004 | Wada |
| 2004/0182086 A1 | 9/2004 | Chiang et al. |
| 2004/0187510 A1 | 9/2004 | Jung |
| 2004/0187803 A1 | 9/2004 | Regev |
| 2004/0250550 A1 | 12/2004 | Bruck |
| 2005/0109490 A1 | 5/2005 | Harmon et al. |
| 2005/0274676 A1 | 12/2005 | Kumar et al. |
| 2006/0130518 A1 | 6/2006 | Kang et al. |
| 2006/0231163 A1 | 10/2006 | Hirosawa et al. |
| 2007/0130960 A1 | 6/2007 | Muller et al. |
| 2007/0220901 A1 | 9/2007 | Kobayashi |
| 2008/0236171 A1 | 10/2008 | Saito et al. |
| 2008/0236175 A1* | 10/2008 | Chaparro Monferrer .............. F25B 21/02 62/3.2 |
| 2008/0303375 A1 | 12/2008 | Carver |
| 2009/0091411 A1 | 4/2009 | Zhang et al. |
| 2009/0158749 A1 | 6/2009 | Sandeman |
| 2009/0217674 A1 | 9/2009 | Kaji et al. |
| 2009/0236930 A1 | 9/2009 | Nashiki |
| 2009/0266083 A1 | 10/2009 | Shin et al. |
| 2009/0308080 A1 | 12/2009 | Han et al. |
| 2010/0000228 A1 | 1/2010 | Wiest et al. |
| 2010/0058775 A1 | 3/2010 | Kaji et al. |
| 2010/0071383 A1 | 3/2010 | Zhang et al. |
| 2010/0116471 A1 | 5/2010 | Reppel |
| 2010/0122488 A1 | 5/2010 | Fukai |
| 2010/0162747 A1 | 7/2010 | Hamel et al. |
| 2010/0209084 A1 | 8/2010 | Nelson et al. |
| 2010/0236258 A1 | 9/2010 | Heitzler et al. |
| 2010/0276627 A1 | 11/2010 | Mazet |
| 2010/0303917 A1 | 12/2010 | Watson et al. |
| 2011/0000206 A1 | 1/2011 | Aprad |
| 2011/0042608 A1 | 2/2011 | Reesink |
| 2011/0048031 A1 | 3/2011 | Barve |
| 2011/0048690 A1 | 3/2011 | Reppel et al. |
| 2011/0058795 A1 | 3/2011 | Kleman et al. |
| 2011/0061398 A1* | 3/2011 | Shih ...................... F25B 21/00 62/3.1 |
| 2011/0062821 A1 | 3/2011 | Chang et al. |
| 2011/0082026 A1 | 4/2011 | Sakatani et al. |
| 2011/0162388 A1 | 7/2011 | Barve et al. |
| 2011/0168363 A9 | 7/2011 | Reppel et al. |
| 2011/0173993 A1 | 7/2011 | Muller et al. |
| 2011/0182086 A1 | 7/2011 | Mienko et al. |
| 2011/0192836 A1 | 8/2011 | Muller et al. |
| 2011/0218921 A1 | 9/2011 | Addala et al. |
| 2011/0239662 A1 | 10/2011 | Bahl et al. |
| 2011/0284196 A1 | 11/2011 | Zanadi |
| 2011/0302931 A1 | 12/2011 | Sohn |
| 2011/0308258 A1 | 12/2011 | Smith et al. |
| 2011/0314836 A1 | 12/2011 | Heitzler et al. |
| 2012/0031108 A1 | 2/2012 | Kobayashi et al. |
| 2012/0033002 A1 | 2/2012 | Seeler et al. |
| 2012/0036868 A1 | 2/2012 | Heitzler et al. |
| 2012/0045698 A1 | 2/2012 | Shima |
| 2012/0060526 A1 | 3/2012 | May et al. |
| 2012/0079834 A1 | 4/2012 | Dinesen |
| 2012/0222427 A1 | 9/2012 | Hassen |
| 2012/0222428 A1 | 9/2012 | Celik et al. |

(56) References Cited

U.S. PATENT DOCUMENTS

| | | |
|---|---|---|
| 2012/0266591 A1 | 10/2012 | Morimoto et al. |
| 2012/0266607 A1 | 10/2012 | Morimoto et al. |
| 2012/0267090 A1 | 10/2012 | Kruglick |
| 2012/0272665 A1 | 11/2012 | Watanabe et al. |
| 2012/0272666 A1 | 11/2012 | Watanabe |
| 2012/0285179 A1 | 11/2012 | Morimoto |
| 2012/0291453 A1 | 11/2012 | Watanabe et al. |
| 2013/0019460 A1 | 1/2013 | Zimm et al. |
| 2013/0020529 A1 | 1/2013 | Chang et al. |
| 2013/0104568 A1 | 5/2013 | Kuo et al. |
| 2013/0106116 A1 | 5/2013 | Kuo et al. |
| 2013/0145573 A1 | 6/2013 | Bizhanzadeh |
| 2013/0180263 A1 | 7/2013 | Choi et al. |
| 2013/0186107 A1 | 7/2013 | Shih et al. |
| 2013/0187077 A1 | 7/2013 | Katter |
| 2013/0192269 A1 | 8/2013 | Wang |
| 2013/0199460 A1 | 8/2013 | Duplessis et al. |
| 2013/0227965 A1 | 9/2013 | Yagi et al. |
| 2013/0232993 A1 | 9/2013 | Saito et al. |
| 2013/0255279 A1 | 10/2013 | Tomimatsu et al. |
| 2013/0269367 A1 | 10/2013 | Meillan |
| 2013/0298571 A1 | 11/2013 | Morimoto et al. |
| 2013/0300243 A1 | 11/2013 | Gieras et al. |
| 2013/0319012 A1 | 12/2013 | Kuo et al. |
| 2013/0327062 A1 | 12/2013 | Watanabe et al. |
| 2014/0020881 A1 | 1/2014 | Reppel et al. |
| 2014/0075958 A1 | 3/2014 | Takahashi et al. |
| 2014/0116538 A1 | 5/2014 | Tanaka et al. |
| 2014/0165594 A1 | 6/2014 | Benedict |
| 2014/0165595 A1 | 6/2014 | Zimm et al. |
| 2014/0190182 A1 | 7/2014 | Benedict |
| 2014/0216057 A1 | 8/2014 | Oezcan |
| 2014/0260373 A1 | 9/2014 | Gerber et al. |
| 2014/0290273 A1 | 10/2014 | Benedict et al. |
| 2014/0290275 A1 | 10/2014 | Muller |
| 2014/0291570 A1 | 10/2014 | Klausner et al. |
| 2014/0305137 A1 | 10/2014 | Benedict |
| 2014/0305139 A1 | 10/2014 | Takahashi et al. |
| 2014/0325996 A1 | 11/2014 | Muller |
| 2014/0366557 A1 | 12/2014 | Mun et al. |
| 2015/0007582 A1 | 1/2015 | Kim et al. |
| 2015/0027133 A1 | 1/2015 | Benedict |
| 2015/0030483 A1 | 1/2015 | Ryu |
| 2015/0033762 A1 | 2/2015 | Cheng et al. |
| 2015/0033763 A1 | 2/2015 | Saito et al. |
| 2015/0047371 A1 | 2/2015 | Hu et al. |
| 2015/0068219 A1 | 3/2015 | Komorowski et al. |
| 2015/0089960 A1 | 4/2015 | Takahashi et al. |
| 2015/0114007 A1 | 4/2015 | Neilson et al. |
| 2015/0168030 A1 | 6/2015 | Leonard et al. |
| 2015/0211440 A1 | 7/2015 | Joffroy |
| 2015/0260433 A1 | 9/2015 | Choi et al. |
| 2015/0267943 A1 | 9/2015 | Kim et al. |
| 2015/0362225 A1 | 12/2015 | Schwartz |
| 2015/0369524 A1 | 12/2015 | Ikegami et al. |
| 2016/0000999 A1 | 1/2016 | Focht et al. |
| 2016/0084544 A1 | 3/2016 | Radermacher et al. |
| 2016/0091227 A1 | 3/2016 | Leonard et al. |
| 2016/0216012 A1 | 7/2016 | Benedict et al. |
| 2016/0238287 A1 | 8/2016 | Benedict |
| 2016/0273811 A1 | 9/2016 | Smith et al. |
| 2016/0282021 A1 | 9/2016 | Zhao et al. |
| 2016/0355898 A1 | 12/2016 | Vieyra Villegas et al. |
| 2016/0356529 A1 | 12/2016 | Humburg |
| 2016/0367982 A1 | 12/2016 | Pennie |
| 2017/0059213 A1 | 3/2017 | Barclay et al. |
| 2017/0071234 A1 | 3/2017 | Garg |
| 2017/0138648 A1 | 5/2017 | Cui et al. |
| 2017/0176083 A1 | 6/2017 | Sul et al. |
| 2017/0328603 A1 | 11/2017 | Barclay et al. |
| 2017/0328649 A1 | 11/2017 | Brandmeier |
| 2017/0370624 A1 | 12/2017 | Zimm et al. |
| 2018/0005735 A1 | 1/2018 | Scharf et al. |
| 2018/0195775 A1 | 7/2018 | Schroeder et al. |
| 2018/0283740 A1 | 10/2018 | Holladay et al. |

FOREIGN PATENT DOCUMENTS

| | | | |
|---|---|---|---|
| CN | 101979937 A | 2/2011 | |
| CN | 201772566 U | 3/2011 | |
| CN | 101788207 B | 9/2011 | |
| CN | 202432596 U | 9/2012 | |
| CN | 103090583 A | 5/2013 | |
| CN | 103712401 A | 4/2014 | |
| CN | 102077303 B | 4/2015 | |
| CN | 106481842 A | 3/2017 | |
| DE | 102013223959 A1 | 5/2015 | |
| DE | 202015106851 U1 | 3/2016 | |
| EP | 0187078 A1 * | 7/1986 | ............... F25B 21/00 |
| EP | 2071255 A1 | 6/2009 | |
| EP | 2108904 A1 | 10/2009 | |
| EP | 2215955 A1 | 8/2010 | |
| EP | 2322072 A2 | 5/2011 | |
| EP | 3306082 A2 | 4/2018 | |
| FR | 2935468 A1 | 3/2010 | |
| JP | 59232922 | 12/1984 | |
| JP | H08166182 A | 6/1996 | |
| JP | 3205196 B2 | 9/2001 | |
| JP | 2002315243 A | 10/2002 | |
| JP | 2007147136 A | 6/2007 | |
| JP | 2007291437 A | 11/2007 | |
| JP | 2008051412 A | 3/2008 | |
| JP | 2010112606 A | 5/2010 | |
| JP | 2010525291 A | 7/2010 | |
| JP | 6212955 B2 | 12/2014 | |
| JP | 2014228216 A | 12/2014 | |
| JP | 5907023 B2 | 4/2016 | |
| JP | 6079498 B2 | 2/2017 | |
| JP | 6191539 B2 | 9/2017 | |
| JP | 2017207222 A | 11/2017 | |
| KR | 101100301 B1 | 12/2011 | |
| KR | 1238234 B1 | 3/2013 | |
| WO | WO 0212800 A1 | 2/2002 | |
| WO | WO 03016794 A1 | 2/2003 | |
| WO | WO 2004/068512 | 8/2004 | |
| WO | WO 2007/036729 A1 | 4/2007 | |
| WO | WO 2009/024412 | 2/2009 | |
| WO | WO2010/119591 A1 | 10/2010 | |
| WO | WO 2011034594 A1 | 3/2011 | |
| WO | WO 2014099199 A1 | 6/2014 | |
| WO | WO 2014170447 A1 | 10/2014 | |
| WO | WO 2014173787 A1 | 10/2014 | |
| WO | WO 2015017230 A1 | 2/2015 | |
| WO | WO2016035267 A1 | 3/2016 | |
| WO | WO 2017042266 A1 | 3/2017 | |
| WO | WO2017097989 A1 | 6/2017 | |

OTHER PUBLICATIONS

Andrej Kitanovski, Present and future caloric refrigeration and heat-pump technologies, International Journal of Refrigeration, vol. 57, Sep. 2015, pp. 288-298.

International Search Report issued in connection with PCT Application No. PCT/US2014/042485 dated Oct. 23, 2014.

International Search Report issued in connection with PCT Application No. PCT/US2014/017431 dated May 9, 2014.

International search report issued in connection with PCT/US2013/070518, dated Jan. 22, 2014.

Tetsuji Okamura, Performance of a room-temperature rotary magnet refrigerator, dated Nov. 28, 2005, Elsevier.

Journal of Alloys and Compounds, copyright 2008 Elsevier B . . . V . . .

Evaluation of Ni—Mn—In—Si Alloys for Magnetic Refrigerant Application, Rahul Das, A. Perumal and A. Srinivasan, Dept of Physics, Indian Institute of Technology, Oct. 10, 2011.

Effects of annealing on the magnetic entropy change and exchange bias behavior in melt-spun Ni—Mn—In ribbons, X.Z. Zhao, C.C. Hsieh, et al Science Direct, Scripta Materialia 63 (2010).

PCT International Search Report and Written Opinion issued in connection with PCT Application No. PCT/US2013/070023 dated Feb. 27, 2014.

(56) References Cited

OTHER PUBLICATIONS

Barbara Pulko, Epoxy-bonded La—Fe—Co—Si magnetocaloric plates, Journal of Magnetism and Magnetic Materials, 375 (2015) 65-73.

International Search Report of PCT/US2014/047925 dated Nov. 10, 2014.

Stefano Dall'Olio, et al., Numerical Simulation of a Tapered Bed AMR, Technical University of Denmark, 2015, 2 pages.

\* cited by examiner

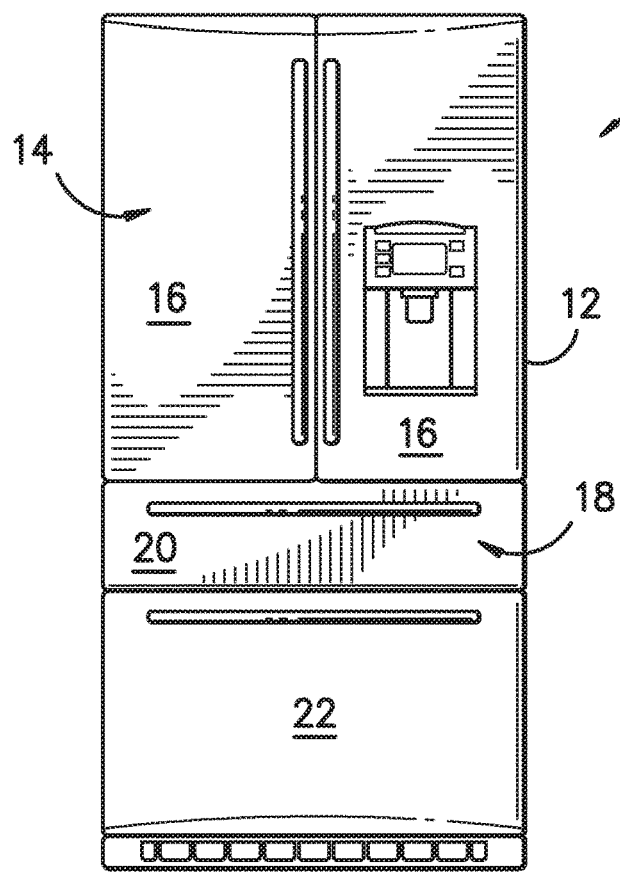
FIG. -1-
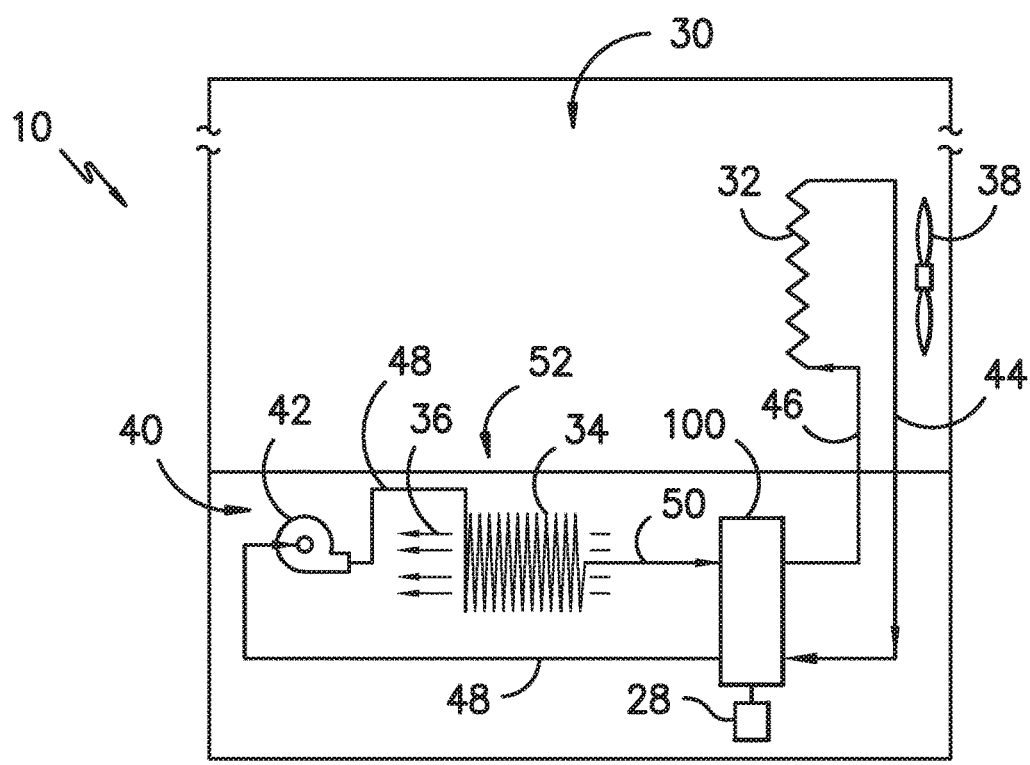
FIG. -2-

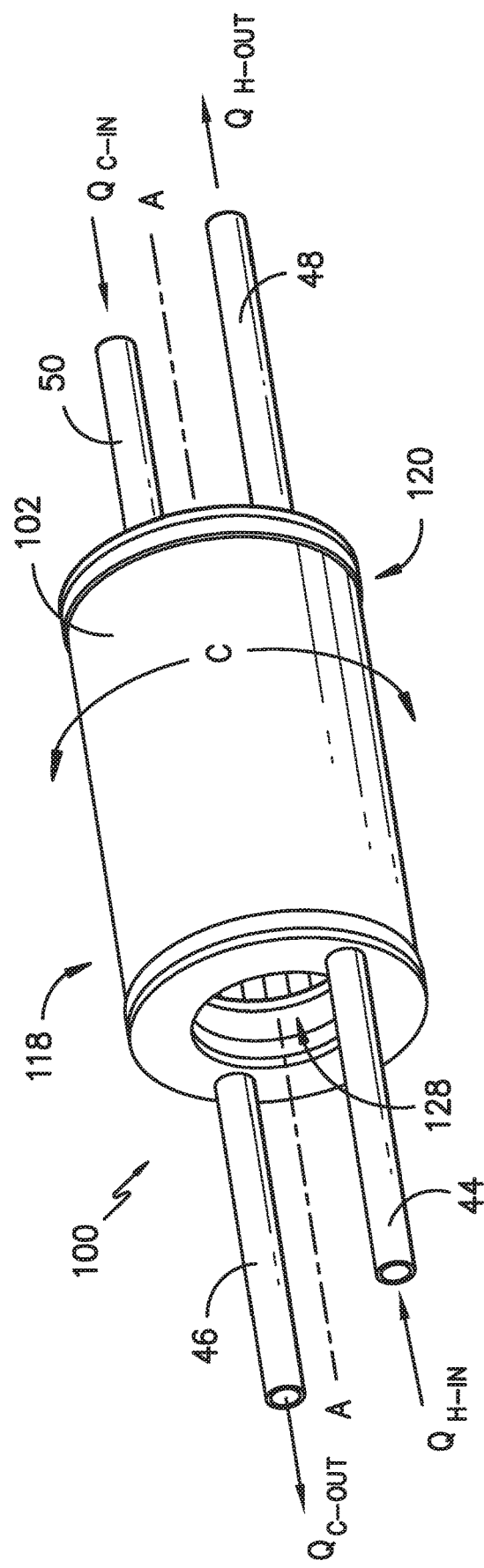
FIG. -3-

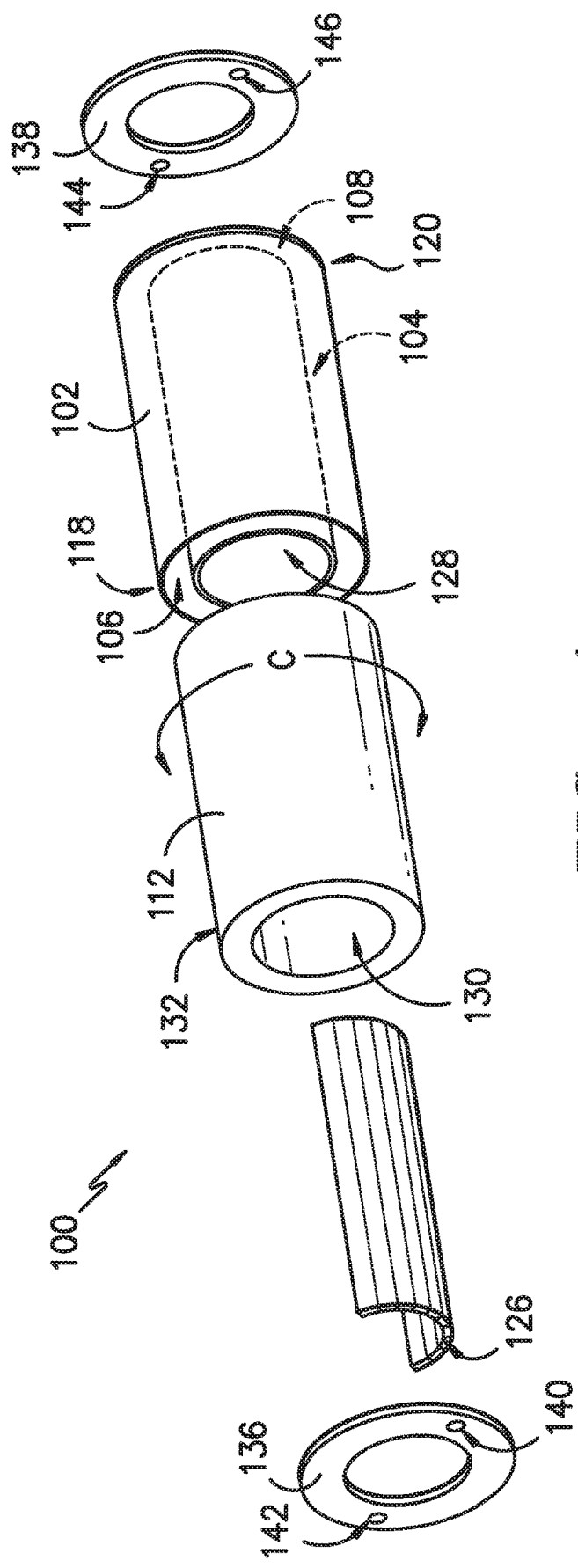
FIG. -4-

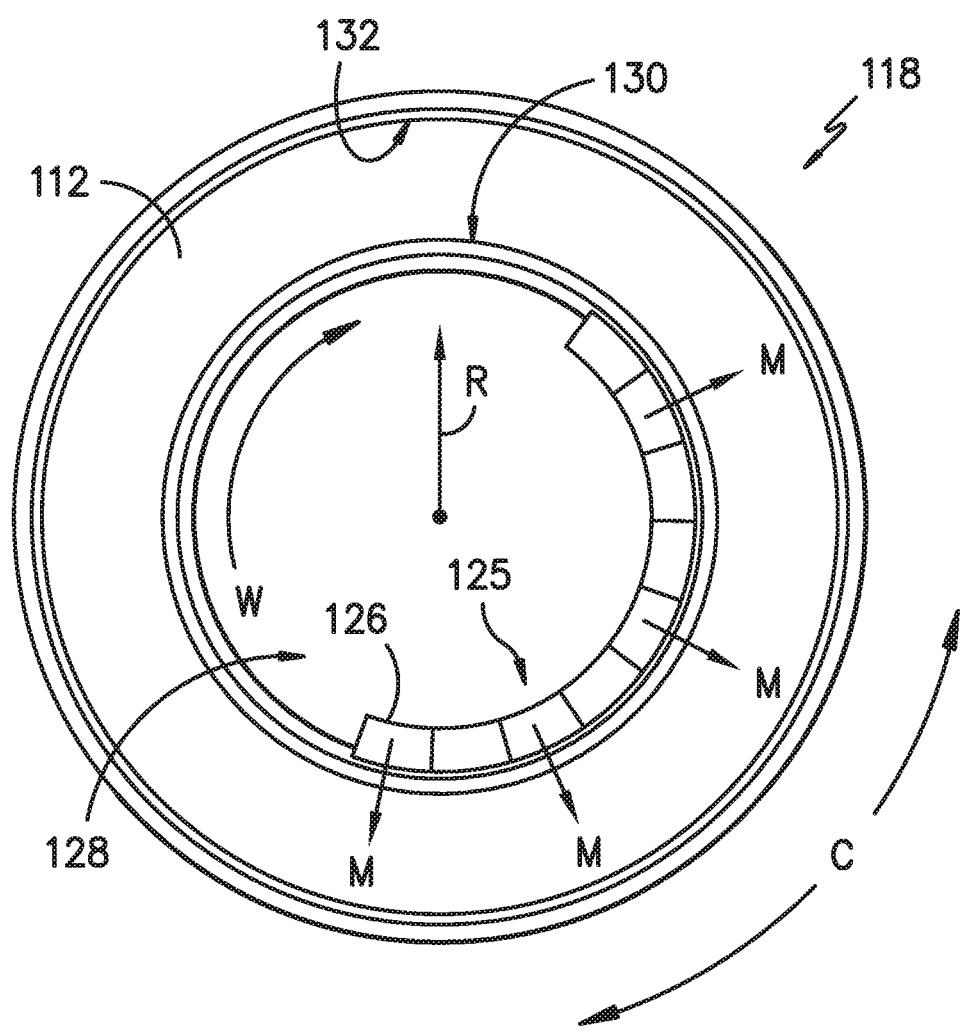
FIG. -5-

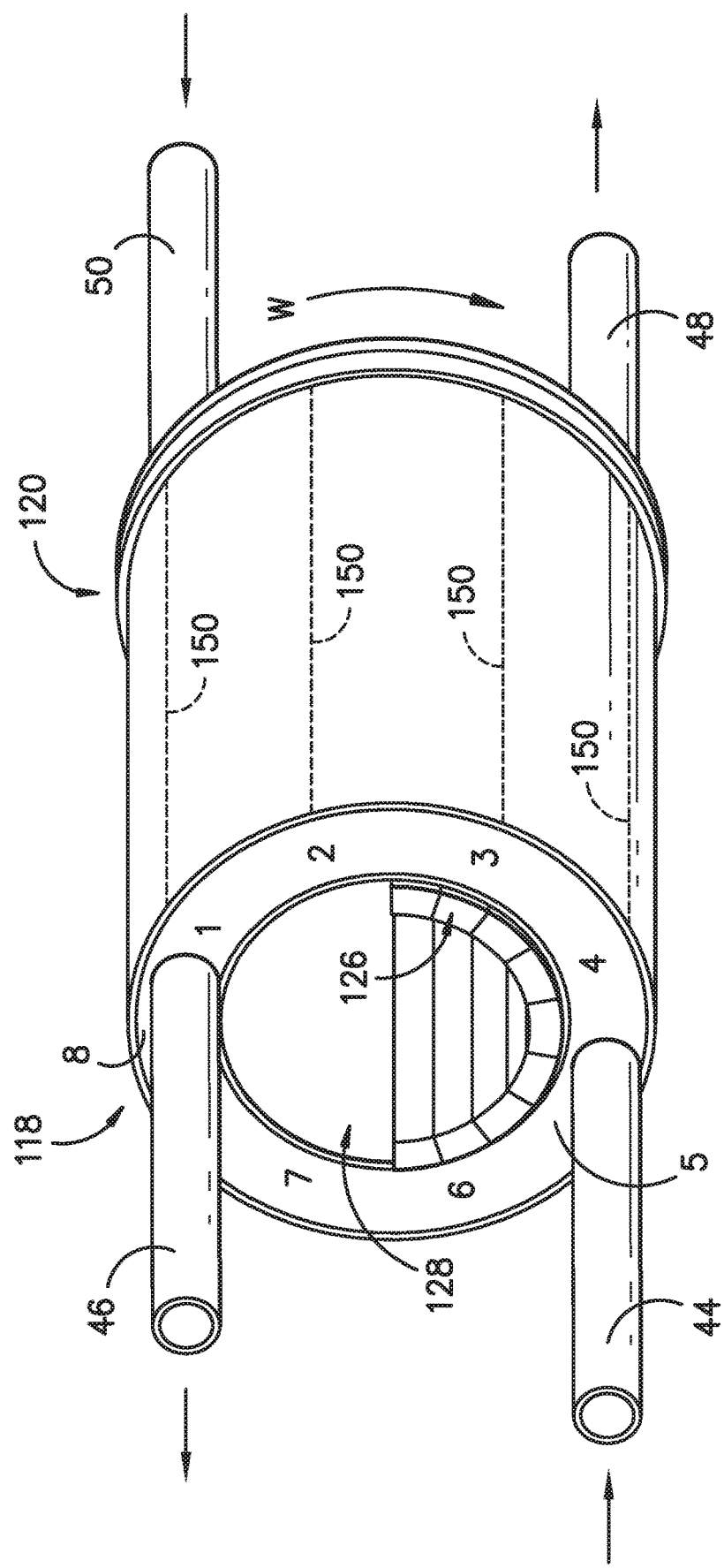
FIG. -6-

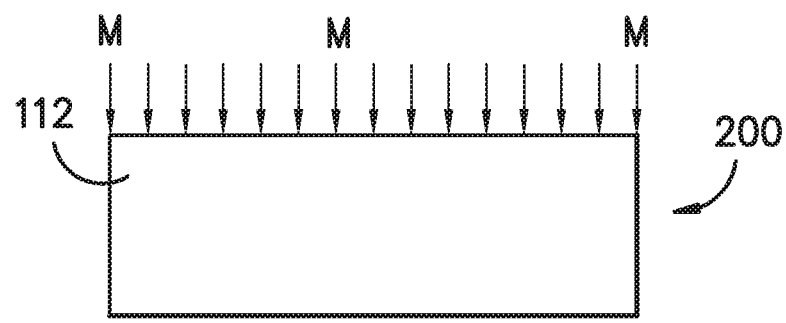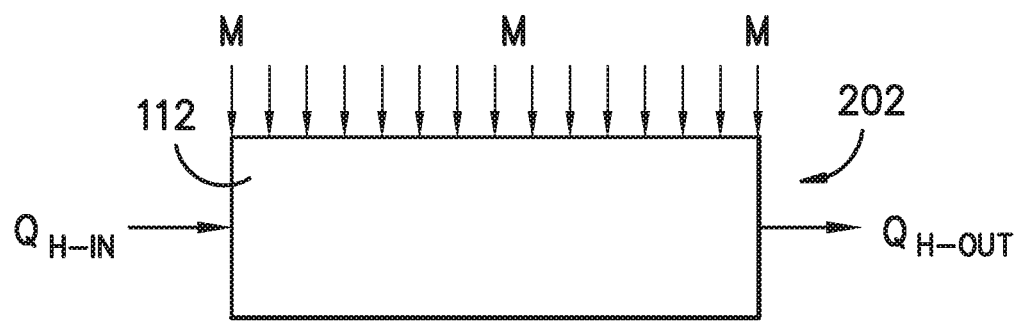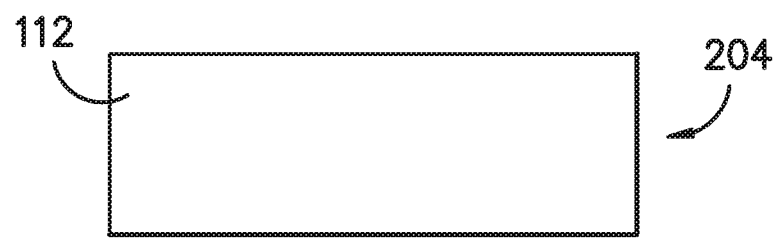
FIG. -7-

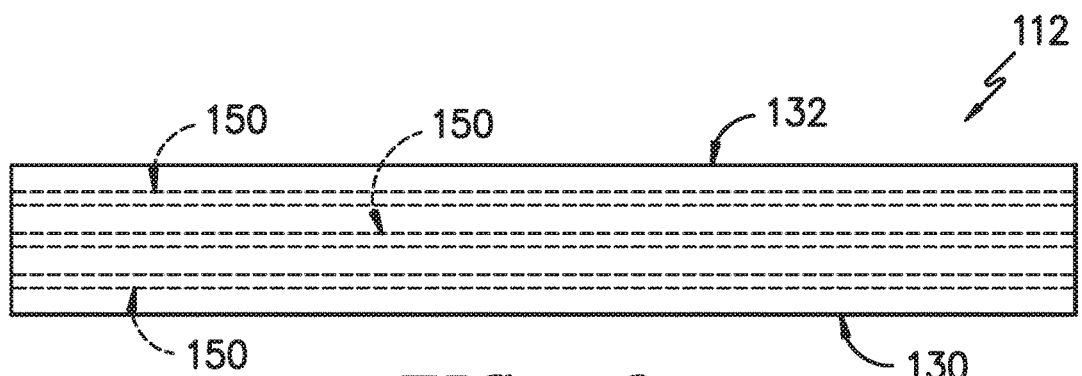
FIG. -8-
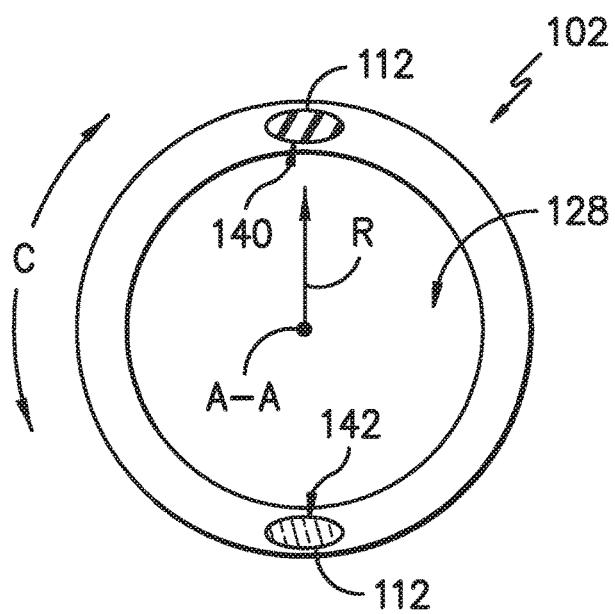
FIG. -9-
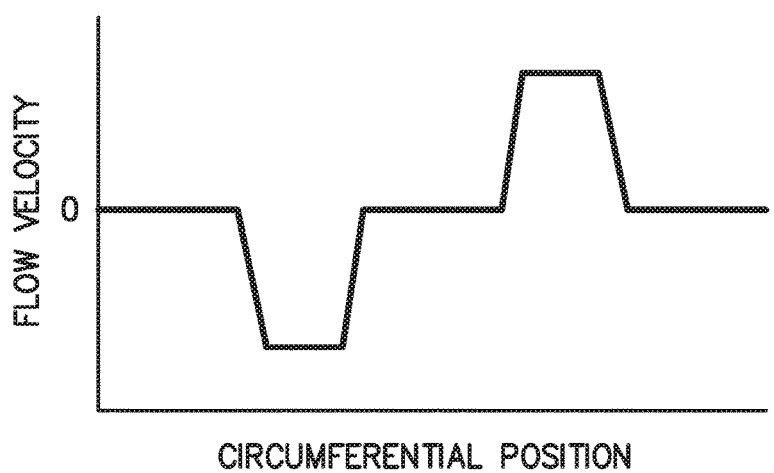
FIG. -10-

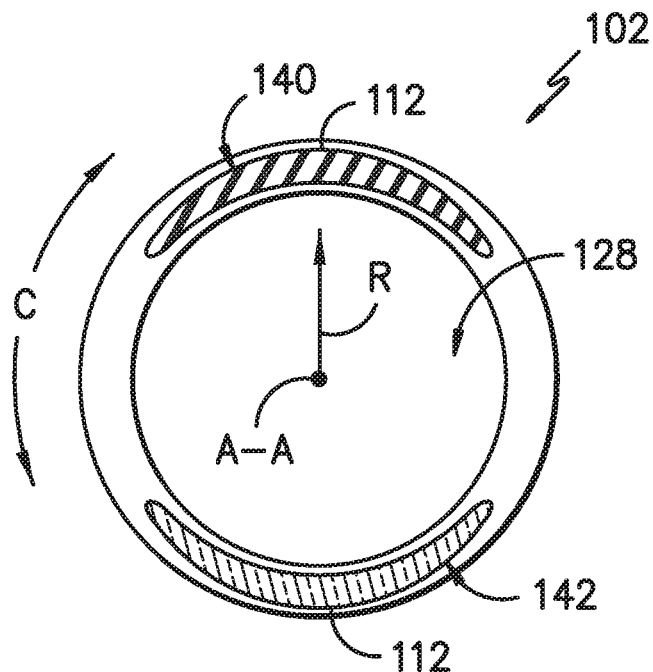
FIG. -11-
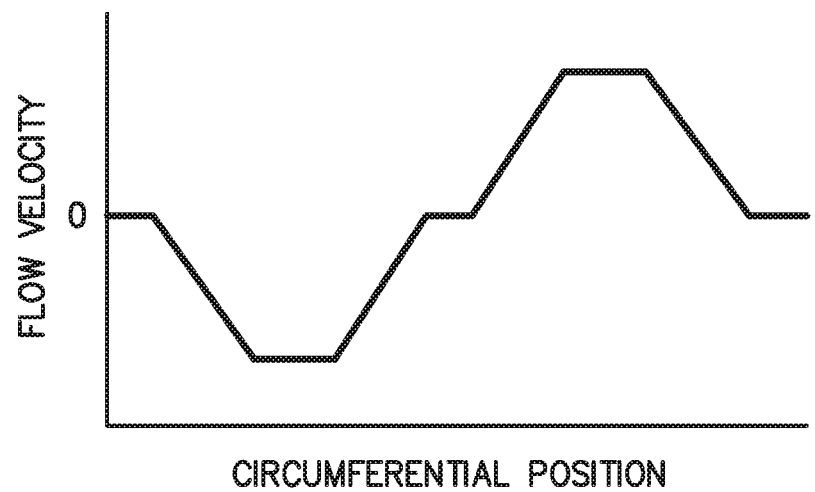
FIG. -12-

CALORIC HEAT PUMP FOR AN APPLIANCE

FIELD OF THE INVENTION

The present subject matter relates generally to heat pumps, such as magneto-caloric heat pumps, for appliances.

BACKGROUND OF THE INVENTION

Conventional refrigeration technology typically utilizes a heat pump that relies on compression and expansion of a fluid refrigerant to receive and reject heat in a cyclic manner so as to effect a desired temperature change or transfer heat energy from one location to another. This cycle can be used to receive heat from a refrigeration compartment and reject such heat to the environment or a location that is external to the compartment. Other applications include air conditioning of residential or commercial structures. A variety of different fluid refrigerants have been developed that can be used with the heat pump in such systems.

While improvements have been made to such heat pump systems that rely on the compression of fluid refrigerant, at best such can still only operate at about forty-five percent or less of the maximum theoretical Carnot cycle efficiency. Also, some fluid refrigerants have been discontinued due to environmental concerns. The range of ambient temperatures over which certain refrigerant-based systems can operate may be impractical for certain locations. Other challenges with heat pumps that use a fluid refrigerant exist as well.

Magneto-caloric materials (MCMs), i.e. materials that exhibit the magneto-caloric effect, provide a potential alternative to fluid refrigerants for heat pump applications. In general, the magnetic moments of MCMs become more ordered under an increasing, externally applied magnetic field and cause the MCMs to generate heat. Conversely, decreasing the externally applied magnetic field allows the magnetic moments of the MCMs to become more disordered and allow the MCMs to absorb heat. Some MCMs exhibit the opposite behavior, i.e. generating heat when the magnetic field is removed (which are sometimes referred to as para-magneto-caloric material but both types are referred to collectively herein as magneto-caloric material or MCM). The theoretical Carnot cycle efficiency of a refrigeration cycle based on an MCMs can be significantly higher than for a comparable refrigeration cycle based on a fluid refrigerant. As such, a heat pump system that can effectively use an MCM would be useful.

Challenges exist to the practical and cost competitive use of an MCM, however. In addition to the development of suitable MCMs, equipment that can attractively utilize an MCM is still needed. Currently proposed equipment may require relatively large and expensive magnets, may be impractical for use in e.g., appliance refrigeration, and may not otherwise operate with enough efficiency to justify capital cost.

Accordingly, a heat pump system that can address certain challenges, such as those identified above, would be useful. Such a heat pump system that can also be used in a refrigerator appliance would also be useful.

BRIEF DESCRIPTION OF THE INVENTION

The present subject matter provides a heat pump system that includes a caloric heat pump with a regenerator housing that is rotatable about an axial direction. A caloric material is disposed within a chamber of the regenerator housing. The caloric material defines a plurality of channels that extend along the axial direction through the caloric material. The channels of the plurality of channels are spaced from one another along a circumferential direction within the caloric material. A working fluid is flowable through the plurality of channels between end portions of the regenerator housing. A related refrigerator appliance is also provided. Additional aspects and advantages of the invention will be set forth in part in the following description, or may be apparent from the description, or may be learned through practice of the invention.

In a first example embodiment, a heat pump system includes a hot side heat exchanger, a cold side heat exchanger, and a pump operable to flow a working fluid between the hot and cold side heat exchangers. A caloric heat pump includes a regenerator housing defining a circumferential direction and rotatable about an axial direction. The regenerator housing extends along the axial direction between a first end portion of the regenerator housing and a second end portion of the regenerator housing. The regenerator housing defines a chamber that extends longitudinally along the axial direction between the first and second end portions of the regenerator housing. A caloric material is disposed within the chamber of the regenerator housing. The caloric material defines a plurality of channels that extend along the axial direction through the caloric material. The channels of the plurality of channels are spaced from one another along the circumferential direction within the caloric material. The working fluid is flowable through the plurality of channels between the first and second end portions of the regenerator housing.

In a second example embodiment, a refrigerator appliance includes a cabinet that defines a chilled chamber. A heat pump system is operable to cool the chilled chamber. The heat pump system includes a cold side heat exchanger positioned at the chilled chamber, a hot side heat exchanger positioned outside the chilled chamber, and a pump operable to flow a working fluid between the hot and cold side heat exchangers. A caloric heat pump includes a regenerator housing that defines a circumferential direction and that is rotatable about an axial direction. The regenerator housing extends along the axial direction between a first end portion of the regenerator housing and a second end portion of the regenerator housing. The regenerator housing defines a chamber that extends longitudinally along the axial direction between the first and second end portions of the regenerator housing. A caloric material is disposed within the chamber of the regenerator housing. The caloric material defines a plurality of channels that extend along the axial direction through the caloric material. The channels of the plurality of channels are spaced from one another along the circumferential direction within the caloric material. The working fluid flowable through the plurality of channels between the first and second end portions of the regenerator housing.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 1 provides an example embodiment of a refrigerator appliance of the present invention.

FIG. 2 is a schematic illustration of a heat pump system of the example refrigerator appliance of FIG. 1.

FIG. 3 provides a perspective view of an example heat pump of the present invention.

FIG. 4 is an exploded view of the example heat pump of FIG. 3.

FIG. 5 is a cross-sectional view of the example heat pump of FIG. 3.

FIG. 6 is perspective view of the example heat pump of FIG. 3.

FIG. 7 is a schematic representation of various steps in the use of a stage of the example heat pump of FIG. 3.

FIG. 8 is a longitudinal section view of the stage of the example heat pump of FIG. 3.

FIG. 9 is a side elevation view of ports as may be formed in the example heat pump of FIG. 3 according to an example embodiment of the present invention.

FIG. 10 is a plot of working fluid velocity through the ports of FIG. 9.

FIG. 11 is a side elevation view of ports as may be formed in the example heat pump of FIG. 3 according to another example embodiment of the present invention.

FIG. 12 is a plot of working fluid velocity through the ports of FIG. 9.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present subject matter is directed to a caloric heat pump system for heating or cooling an appliance, such as a refrigerator appliance. While described in greater detail below in the context of a magneto-caloric heat pump system, one of skill in the art using the teachings herein will recognize that other suitable caloric materials may be used in a similar manner to heat or cool an appliance, i.e., apply a field, move heat, remove the field, move heat. For example, electro-caloric material heats up and cools down within increasing and decreasing electric fields. As another example, elasto-caloric material heats up and cools down when exposed to increasing and decreasing mechanical strain. As yet another example, baro-caloric material heats up and cools down when exposed to increasing and decreasing pressure. Such materials and other similar caloric materials may be used in place of or in addition to the magneto-caloric material described below to heat or cool liquid/water within an appliance. Thus, caloric material is used broadly herein to encompass materials that undergo heating or cooling when exposed to a changing field from a field generator, where the field generator may be a magnet, an electric field generator, an actuator for applying mechanical stress or pressure, etc.

Referring now to FIG. 1, an example embodiment of a refrigerator appliance 10 is depicted as an upright refrigerator having a cabinet or casing 12 that defines a number of internal storage compartments or chilled chambers. In particular, refrigerator appliance 10 includes upper fresh-food compartments 14 having doors 16 and lower freezer compartment 18 having upper drawer 20 and lower drawer 22. The drawers 20, 22 are "pull-out" type drawers in that they can be manually moved into and out of the freezer compartment 18 on suitable slide mechanisms. Refrigerator 10 is provided by way of example only. Other configurations for a refrigerator appliance may be used as well including appliances with only freezer compartments, only chilled compartments, or other combinations thereof different from that shown in FIG. 1. In addition, the heat pump and heat pump system of the present invention is not limited to appliances and may be used in other applications as well such as e.g., air-conditioning, electronics cooling devices, and others. Thus, it should be understood that while the use of a heat pump to provide cooling within a refrigerator is provided by way of example herein, the present invention may also be used to provide for heating applications as well.

FIG. 2 is a schematic view of the refrigerator appliance 10. As may be seen in FIG. 2, refrigerator appliance 10 includes a refrigeration compartment 30 and a machinery compartment 40. Machinery compartment 30 includes a heat pump system 52 having a first heat exchanger 32 positioned in the refrigeration compartment 30 for the removal of heat therefrom. A heat transfer fluid such as e.g., an aqueous solution, flowing within first heat exchanger 32 receives heat from the refrigeration compartment 30 thereby cooling contents of the refrigeration compartment 30. A fan 38 may be used to provide for a flow of air across first heat exchanger 32 to improve the rate of heat transfer from the refrigeration compartment 30.

The heat transfer fluid flows out of first heat exchanger 32 by line 44 to heat pump 100. As will be further described herein, the heat transfer fluid receives additional heat from caloric material in heat pump 100 and carries this heat by line 48 to pump 42 and then to second heat exchanger 34. Heat is released to the environment, machinery compartment 40, and/or other location external to refrigeration compartment 30 using second heat exchanger 34. A fan 36 may be used to create a flow of air across second heat exchanger 34 and thereby improve the rate of heat transfer to the environment. Pump 42 connected into line 48 causes the heat transfer fluid to recirculate in heat pump system 52. Motor 28 is in mechanical communication with heat pump 100 as will further described.

From second heat exchanger 34 the heat transfer fluid returns by line 50 to heat pump 100 where, as will be further described below, the heat transfer fluid loses heat to the caloric material in heat pump 100. The now colder heat transfer fluid flows by line 46 to first heat exchanger 32 to receive heat from refrigeration compartment 30 and repeat the cycle as just described.

Heat pump system 52 is provided by way of example only. Other configurations of heat pump system 52 may be used as well. For example, lines 44, 46, 48, and 50 provide fluid communication between the various components of the heat pump system 52 but other heat transfer fluid recirculation loops with different lines and connections may also be employed. For example, pump 42 can also be positioned at other locations or on other lines in system 52. Still other configurations of heat pump system 52 may be used as well.

FIGS. 3, 4, 5, and 6 depict various views of an example heat pump 100 of the present invention. Heat pump 100 includes a regenerator housing 102 that extends longitudinally along an axial direction between a first end portion 118 and a second end portion 120. The axial direction is defined by axis A-A about which regenerator housing 102 rotates. A radial direction R is defined by a radius extending orthogonally from the axis of rotation A-A (FIG. 5). A circumferential direction is indicated by arrows C.

Regenerator housing 102 defines a chamber 104 that extends longitudinally along the axial direction defined by axis A-A. For example, chamber 104 may extend along the axial direction defined by axis A-A between first and second end portions 118, 120 of regenerator housing 102. Chamber 104 may also extend along circumferential direction C about the axis A-A. Chamber 104 includes a pair of openings 106, 108 positioned at opposing end portions 118, 120 of regenerator housing 102.

Heat pump 100 also includes a stage 112 that include caloric material. Stage 112 is located in chamber 104 and extends along the axial direction, e.g., between first and second end portions 118, 120 of regenerator housing 102. Stage 112 may also extend along circumferential direction C about the axis A-A. Thus, stage 112 may have a cylindrical shape that is complementary to and/or fills chamber 104. In particular, stage 112 may have a cylindrical inner surface 130 and a cylindrical outer surface 132 that are spaced along the radial direction R. Stage 112 may be a single, unitary piece of caloric material in certain example embodiments. Thus, regenerator housing 102 may not include baffles or walls that separate the stage 112 into sections.

Regenerator housing 102 defines a cavity 128 that is positioned radially inward of the chamber 104 and extends along the axial direction between first and second end portions 118, 120 of regenerator housing 102. A field generator 126 (e.g., a magnet) is positioned within cavity 128 and, for this example embodiment, extends along the axial direction between first end 118 and second end portion 120. Field generator 126 provides a field (e.g., a magnetic field) that is directed radially outward as indicated by arrows M in FIG. 5.

The positioning and configuration of field generator 126 is such that only a portion of stage 112 is within field M at any one time. For example, as shown in FIG. 5, about half of stage is within the field M while the remainder of stage 112 is positioned remote from or outside of the field M created by field generator 126. However, as regenerator housing 102 is continuously rotated along the circumferential direction as shown by arrow W, the portion of stage 112 within the field M will continuously change as some of stage 112 will enter field M and another portion of stage 112 will exit the field M.

A pair of valves or seals 136, 138 is provided such that the seals 136, 138 are positioned in an opposing manner at the first and second end portions 118, 120 of regenerator housing 102. More particularly, a first seal 136 is positioned at first end portion 118 and a second seal 138 is positioned at second end 120. First seal 136 has a first inlet port 140 and a first outlet port 142. The ports 140, 142 of first seal 136 are positioned adjacent to opening 106 of chamber 104. As shown, ports 140, 142 are positioned one hundred and eighty (180) degrees apart about the circumferential direction C of first seal 136. However, other configurations may be used. For example, ports 140, 142 may be positioned within a range of about one hundred and seventy (170) degrees to about one hundred and ninety (190) degrees about the circumferential direction C as well.

Second seal 138 has a second inlet port 144 and a second outlet port 146. The ports 144, 146 of second seal 138 are positioned adjacent to opening 108 of chamber 104. As shown, ports 144, 146 are positioned one hundred and eighty (180) degrees apart about the circumferential direction C of second seal 138. However, other configurations may be used. For example, ports 144, 146 may be positioned within a range of about one hundred and seventy (170) degrees to about one hundred and ninety (190) degrees about the circumferential direction C as well. Ports 144, 146 are connected with lines 50, 48 (FIG. 1), respectively. As such, the rotation of regenerator housing 102 about axis A-A sequentially places lines 48, 50 in fluid communication with the channels within the caloric material of stage 112 as will be further described. Notably, at any one time during rotation of regenerator housing 102, lines 46, 50 may each be in fluid communication with at least channel 150 within the caloric material of stage 112 while lines 44, 48 may also be in fluid communication with at least one other channel 150 within the caloric material of stage 112 about one hundred and eighty (180) degrees away along the circumferential direction.

A heat transfer fluid may flow into chamber 104 through inlet ports 140, 144 of seals 136, 138 so as to flow through the caloric material in stage 112 and then exit through outlet ports 142, 146 of seals 136, 138. A reverse path can be used for flow of the heat transfer fluid in the opposite direction through the stage 112. Seals 136, 138 may be positioned relative to regenerator housing 102 such that working fluid flows through channels 150 within stage 112 when aligned with ports of seals 136, 138. Tight clearances between seals 136, 138 and stage 112 may allow working fluid flow to only pass through channels 150 adjacent and/or aligned with ports 140 through 146. Regenerator housing 102 may be rotatable relative to first and second seal 136, 138. Ports 140, 142 are connected with lines 44, 46 (FIG. 1), respectively. As such, the rotation of regenerator housing 102 about axis A-A sequentially places lines 44, 46 in fluid communication with channels within the caloric material of stage 112 as will be further described.

FIG. 7 illustrates an example method of the present invention using a schematic representation of a portion of stage 112 of caloric material in regenerator housing 102 as it rotates in the direction of arrow W between positions 1 through 8 as shown in FIG. 6. During step 200, the portion of stage 112 is fully within field M, which causes the moments of the material to orient and the caloric material to heat as part of the caloric effect. Ordering of the field is created and maintained as the portion of stage 112 is rotated sequentially through positions 2, 3, and then 4 (FIG. 6) as regenerator housing 102 is rotated in the direction of arrow W. During the time at positions 2, 3, and 4, the heat transfer fluid dwells in the caloric material of the portion of stage 112 and, therefore, is heated.

In step 202, as regenerator housing 102 continues to rotate in the direction of arrow W, the portion of stage 112 will eventually reach position 5. As shown in FIGS. 3 and 6, at position 5 the heat transfer fluid can flow through the material as inlet port 140 in first seal 136 is aligned with the channels 150 within the portion of stage 112 while outlet port 146 in second seal 138 at the second end portion 120 is also aligned with the channels 150 within the portion of stage 112. As indicated by arrow $Q_{H-OUT}$, heat transfer fluid in the portion of stage 112, now heated by the caloric material, can travel out of regenerator housing 102 and along line 48 to the second heat exchanger 34. At the same time, and as indicated by arrow $Q_{H-IN}$, heat transfer fluid from first heat exchanger 32 flows into the portion of stage 112 from line 44 when stage 112 is at position 5. Because heat transfer fluid from the first heat exchanger 32 is relatively cooler than the caloric material in stage 112, the caloric material will lose heat to the heat transfer fluid.

Referring again to FIG. 7 and step 204, as regenerator housing 102 continues to rotate in the direction of arrow W, the portion of stage 112 is moved sequentially through positions 6, 7, and 8 where the portion of stage 112 is completely or substantially out of field M. The absence or lessening of the field M is such that the moments of the material become disordered and the caloric material absorbs heat as part of the caloric effect. During the time in positions 6, 7, and 8, the heat transfer fluid dwells in the caloric material of the portion of stage 112 and, therefore, is cooled by losing heat to the caloric material as the moments disorder.

Referring to step 206 of FIG. 7, as regenerator housing 102 continues to rotate in the direction of arrow W, the portion of stage 112 will eventually reach position 1. As shown in FIGS. 3 and 6, at position 1 the heat transfer fluid in the portion of stage 112 can flow through the material as inlet port 144 in second seal 138 is aligned with the channels 150 within the portion of stage 112 while outlet port 142 in first seal 136 is also aligned with the channels 150 within the portion of stage 112. As indicated by arrow $Q_{C-OUT}$, heat transfer fluid in the portion of stage 112, now cooled by the caloric material, can travel out of regenerator housing 102 and along line 46 to the first heat exchanger 32. At the same time, and as indicated by arrow $Q_{C-IN}$, heat transfer fluid from second heat exchanger 34 flows into the portion of stage 112 from line 50 when the portion of stage 112 is at position 5. Because heat transfer fluid from the second heat exchanger 34 is relatively warmer than the caloric material in the portion of stage 112 at position 5, the caloric material will lose some of its heat to the heat transfer fluid. The heat transfer fluid now travels along line 46 to the first heat exchanger 32 to receive heat and cool the refrigeration compartment 30.

As regenerator housing 102 is rotated continuously, the above described process of placing each portion of stage 112 in and out of field M is repeated. Additionally, the size of field M and regenerator housing 102 are such that one portion of stage 112 may be within the field F at any given time during rotation. Similarly, the remainder of the stage 112 may be outside (or substantially outside) of the field M at any given time during rotation. Additionally, at any given time, there may be only a portion of stage 112 through which the heat transfer fluid is flowing while the remainder of stage 112 remains in a dwell mode. More specifically, while one portion of stage 112 is losing heat through the flow of heat transfer fluid at position 5, another portion of stage 112 is receiving heat from the flowing heat transfer fluid at position 1, while all remaining portions of stage 112 are in dwell mode. As such, the system can be operated continuously to provide a continuous recirculation of heat transfer fluid in heat pump system 52 as stage 112 rotates through positions 1 through 8.

As will be understood by one of skill in the art using the teachings disclosed herein, the number of ports in seals 136, 138 and/or other parameters can be varied to provide different configurations of heat pump 100 while still providing for continuous operation. For example, each valve could be provided within two inlet ports and two outlet ports so that heat transfer fluid flows through at least four portions of stage 112 at any particular point in time. Alternatively, regenerator housing 102 and/or seals 136, 138 could be constructed so that e.g., at least two portions of stage 112 are in fluid communication with an inlet port and outlet port at any one time. Other configurations may be used as well.

As stated, stage 112 includes caloric material extending along the axial direction of flow. The caloric material may be constructed from a single magneto caloric material or may include multiple different magneto caloric materials. By way of example, appliance 10 may be used in an application where the ambient temperature changes over a substantial range. However, a specific magneto caloric material may exhibit the magneto caloric effect over only a much narrower temperature range. As such, it may be desirable to use a variety of magneto caloric materials within a given stage to accommodate the wide range of ambient temperatures over which appliance 10 and/or heat pump 100 may be used.

Accordingly, stage 112 can be provided with zones of different magneto caloric materials. Each such zone may include a caloric material that exhibits the caloric effect at a different temperature or a different temperature range than an adjacent zone along the axial direction of stage 112. By configuring the appropriate number sequence of zones of caloric material, heat pump 100 can be operated over a substantial range of ambient temperatures.

A motor 28 is in mechanical communication with regenerator housing 102 and provides for rotation of housing 102 about axis A-A. By way of example, motor 28 may be connected directly with housing 102 by a shaft or indirectly through a gear box. Other configurations may be used as well.

FIG. 8 is a longitudinal section view of stage 112. As may be seen in FIGS. 6 and 8, stage 112 defines a plurality of channels 150. Channels 150 extend along the axial direction defined by axis A-A through stage 112. Channels 150 may be spaced from one another along the circumferential direction C and/or the radial direction R within stage 112. Channels 150 may also be distributed about the axial direction defined by axis A-A within stage 112. In particular, channels 150 may be uniformly spaced from one another along the circumferential direction C within stage 112. Thus, channels 150 may be distributed throughout the cylindrically shaped stage 112.

The working fluid of heat pump 100 is flowable through channels 150 within stage 112 as the working fluid flows between first and second end portions 118, 120 of regenerator housing 102. Channels 150 may be spaced from each other within stage 112 such that fluid communication between adjacent channels 150 is blocked or limited by the material of stage 112. Thus, channels 150 may be isolated from each other and form independent flow paths for working fluid through stage 112. In such a manner, channels 150 may be positioned and sized to regulate working fluid flow through stage 112, and regenerator housing 102 need not include baffles or walls to separate the caloric material of stage 112 into segments.

Channels 150 may be formed within stage 112 using any suitable method or mechanism. For example, stage 112 may be additively formed to shape channels 150 within stage 112. As another example, stage 112 may be powder pressed with pins or blanks corresponding to channels 150. Channels 150 may also have any suitable width along one or more of the radial direction R and the circumferential direction C. As an example, the width of channels 150 may be about one hundred microns. As used herein the term "about" means within fifty percent of the stated width when used in the context of widths. Thus, channels 150 may be referred to as micro-channels in certain example embodiments. As another example, the width of channels 150 may be no less than fifty microns and no greater than one millimeter. The number and sizing of channels 150 within stage 112 may be selected to provide a suitable filled space within stage 112. For example, the number and sizing of channels 150 within stage 112 may be selected such that the filled space within stage 112 is no less than twenty percent and no greater than seventy percent. It will be understood that the term "filled space" corresponds to a ratio of a volume of the caloric, binder and other solid material within stage 112 to a total volume of the stage 112. Thus, no less than thirty percent and no greater than eighty percent of the total volume of stage 112 may be void to form channels 150.

FIG. 9 is a side elevation view of ports 140, 142 according to an example embodiment of the present invention. FIG. 10 is a plot of working fluid velocity through a channel 150 during rotation of regenerator housing 102 and with ports 140, 142 sized as shown in FIG. 9. FIG. 11 is a side elevation view of ports 140, 142 according to another example embodiment of the present invention. FIG. 12 is a plot of working fluid velocity through a channel 150 during rotation of regenerator housing 102 and with ports 140, 142 sized as shown in FIG. 11. It will be understood that ports 144, 146 may be similarly shaped to ports 140, 142.

As shown in FIGS. 9 through 12, the sizing, placement and/or shape of ports 140, 142 may be selected to adjust the flow velocity and position of working fluid through stage 112. For example, ports 140, 142 in FIG. 9 are smaller along the circumferential direction C relative to ports 140, 142 in FIG. 11. Thus, as shown in FIG. 10, the working fluid has a longer dwell stage with the ports 140, 142 shown FIG. 9 compared to the ports 140, 142 in FIG. 11.

As may be seen from the above, the present subject matter provides a rotating caloric regenerator with channels (e.g., micro-channels) that passes through a field. A steady stream of working fluid provided by a pump flows through a low field section of the caloric regenerator and returns through a high field section of the caloric regenerator. Such fluid flow provides a regenerative caloric heat pump cycle. Interfacing stationary ports maintain tight clearances to the caloric regenerator thereby allowing flow to only pass through a nearby portion of the channels within the caloric regenerator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A heat pump system, comprising
a hot side heat exchanger;
a cold side heat exchanger;
a pump operable to flow a working fluid between the hot and cold side heat exchangers;
a caloric heat pump comprising
a regenerator housing defining a circumferential direction and rotatable about an axial direction, the regenerator housing extending along the axial direction between a first end portion of the regenerator housing and a second end portion of the regenerator housing, the regenerator housing defining a chamber that extends longitudinally along the axial direction between the first and second end portions of the regenerator housing; and a caloric material disposed within the chamber of the regenerator housing, the caloric material defining a plurality of channels that extend along the axial direction through the caloric material, the channels of the plurality of channels spaced from one another along the circumferential direction within the caloric material, the working fluid flowable through the plurality of channels between the first and second end portions of the regenerator housing,
wherein the caloric material extends continuously along the axial and circumferential directions within the chamber of the regenerator housing,
wherein no baffle or wall that divides the caloric material is disposed within the chamber of the regenerator housing, and
wherein the caloric material has a cylindrical inner surface and a cylindrical outer surface that are spaced along a radial direction.

2. The heat pump system of claim 1, further comprising a first valve and a second valve, the first valve attached to the first end portion of the regenerator housing, the second valve attached to the second end portion of the regenerator housing, the first valve and second valve each comprising a fixed plate defining an opening, the working fluid from each of the plurality of channels flowing through the openings of the fixed plates of the first and second valves during rotation of the regenerator housing when each of the plurality of channels is aligned with the openings of the fixed plates of the first and second valves along the axial direction.

3. The heat pump system of claim 1, wherein the channels of the plurality of channels are distributed about the axial direction within the caloric material.

4. The heat pump system of claim 3, wherein the channels of the plurality of channels are uniformly spaced from one another along the circumferential direction within the caloric material.

5. The heat pump system of claim 1, further comprising a magnet, the caloric material being a magnetocaloric material, the magnet creating a magnetic field, the magnet positioned such that only a portion of the magnetocaloric material is disposed within the magnetic field as the regenerator housing rotates about the axial direction.

6. The heat pump system of claim 1, further comprising a motor coupled to the regenerator housing and operable to the regenerator housing about the axial direction.

7. A refrigerator appliance, comprising:
a cabinet defining a chilled chamber; and
a heat pump system operable to cool the chilled chamber, the heat pump system comprising
a cold side heat exchanger positioned at the chilled chamber;
a hot side heat exchanger positioned outside the chilled chamber;
a pump operable to flow a working fluid between the hot and cold side heat exchangers;
a caloric heat pump comprising
a regenerator housing defining a circumferential direction and rotatable about an axial direction, the regenerator housing extending along the axial direction between a first end portion of the regenerator housing and a second end portion of the regenerator housing, the regenerator housing defining a chamber that extends longitudinally along the axial direction between the first and second end portions of the regenerator housing; and a caloric material disposed within the chamber of the regenerator housing, the caloric material defining a plurality of channels that extend along the axial direction through the caloric material, the channels of the plurality of channels spaced from one another along the circumferential direction within the caloric material, the working fluid flowable through the plurality of channels between the first and second end portions of the regenerator housing, wherein the caloric material extends continuously along the axial and circumferential directions within the chamber of the regenerator housing, wherein no baffle or wall that divides the caloric material is disposed within the chamber of the regenerator housing, and wherein the caloric material has a cylindrical inner surface and a cylindrical outer surface that are spaced along a radial direction.

8. The refrigerator appliance of claim 7, further comprising a first valve and a second valve, the first valve attached to the first end portion of the regenerator housing, the second valve attached to the second end portion of the regenerator housing, the first valve and second valve each comprising a fixed plate defining an opening, the working fluid from each of the plurality of channels flowing through the openings of the fixed plates of the first and second valves during rotation of the regenerator housing when each of the plurality of channels is aligned with the openings of the fixed plates of the first and second valves along the axial direction.

9. The refrigerator appliance of claim 7, wherein the channels of the plurality of channels are distributed about the axial direction within the caloric material.

10. The refrigerator appliance of claim 9, wherein the channels of the plurality of channels are uniformly spaced from one another along the circumferential direction within the caloric material.

11. The refrigerator appliance of claim 7, further comprising a magnet, the caloric material being a magnetocaloric material, the magnet creating a magnetic field, the magnet positioned such that only a portion of the magnetocaloric material is disposed within the magnetic field as the regenerator housing rotates about the axial direction.

12. The refrigerator appliance of claim 7, further comprising a motor coupled to the regenerator housing and operable to the regenerator housing about the axial direction.

13. The heat pump system of claim 1, wherein a width of each of the plurality of channels is no less than fifty microns and no greater than one millimeter.

14. The refrigerator appliance of claim 7, wherein a width of each of the plurality of channels is no less than fifty microns and no greater than one millimeter.

* * * * *